(12) United States Patent
Henseler

(10) Patent No.: US 9,967,006 B2
(45) Date of Patent: May 8, 2018

(54) SCALABLE BEAM STEERING CONTROLLER SYSTEMS AND METHODS

(71) Applicant: Raytheon Company, Waltham, MA (US)

(72) Inventor: Glenn D. Henseler, Marana, AZ (US)

(73) Assignee: Raytheon Company, Waltham, MA (US)

( * ) Notice: Subject to any disclaimer, the term of this patent is extended or adjusted under 35 U.S.C. 154(b) by 14 days.

(21) Appl. No.: 15/239,897

(22) Filed: Aug. 18, 2016

(65) Prior Publication Data

US 2018/0054238 A1    Feb. 22, 2018

(51) Int. Cl.
*H04B 1/00* (2006.01)
*H04B 15/00* (2006.01)
*H04M 1/00* (2006.01)
*H04B 7/04* (2017.01)

(52) U.S. Cl.
CPC ............. *H04B 7/043* (2013.01); *H04B 7/04* (2013.01)

(58) Field of Classification Search
CPC ...... H01Q 3/2629; H01Q 19/00; H04W 16/28
USPC ..................................... 455/63.3–63.4, 562.1
See application file for complete search history.

(56) References Cited

U.S. PATENT DOCUMENTS

| 5,027,126 A | * | 6/1991 | Basehgi | H01Q 3/38 342/372 |
| 5,923,289 A | * | 7/1999 | Buer | H01Q 3/2605 342/368 |
| 5,952,965 A | * | 9/1999 | Kowalski | H01Q 3/2611 342/372 |
| 5,990,830 A | * | 11/1999 | Vail | H01Q 3/22 342/368 |
| 6,992,638 B2 | * | 1/2006 | du Toit | H01Q 3/242 343/711 |
| 8,149,166 B1 | | 4/2012 | Buxa | |
| 9,252,868 B1 | * | 2/2016 | Bull | |
| 9,450,310 B2 | * | 9/2016 | Bily | H01Q 13/28 |
| 2005/0001784 A1 | | 1/2005 | Oliver et al. | |
| 2008/0268790 A1 | | 10/2008 | Shi et al. | |

(Continued)

OTHER PUBLICATIONS

PCT Search Report & Written Opinion of the ISA dated Jul. 19, 2017 from International Application No. PCT/US2017/026548; 15 Pages.

*Primary Examiner* — Simon Nguyen
(74) *Attorney, Agent, or Firm* — Daly, Crowley, Mofford & Durkee, LLP

(57) ABSTRACT

The concepts, systems and method described herein provide a scalable beam steering control system having a primary beam steering controller and one or more secondary beam steering controllers to control a direction of a beam generated by an antenna array. The scalable beam steering control system may include a plurality of array blocks, each array block having one or more array elements. The primary controller block may be coupled to at least one array block and include a beam steering module to generate beam steering signals for the one or more array elements of the array block. The one or more secondary controller blocks may be coupled to the primary controller block and at least one array block. In an embodiment, each secondary controller block may include a beam steering module to generate beam steering signals for array elements of at least one array block.

19 Claims, 8 Drawing Sheets

(56) References Cited

U.S. PATENT DOCUMENTS

| | | | |
|---|---|---|---|
| 2009/0322610 A1* | 12/2009 | Hants | H01Q 3/2694 342/372 |
| 2011/0122026 A1 | 5/2011 | DeLaquil et al. | |
| 2011/0148706 A1* | 6/2011 | Eom | H01Q 3/2629 342/372 |
| 2012/0003946 A1* | 1/2012 | Ono | H01Q 3/30 455/115.1 |
| 2014/0203969 A1* | 7/2014 | Maltsev | H01Q 3/36 342/375 |
| 2015/0087248 A1* | 3/2015 | Yehezkely | H04B 1/0007 455/84 |
| 2015/0222013 A1* | 8/2015 | Choi | H01Q 3/04 343/879 |
| 2016/0218429 A1* | 7/2016 | Klemes | H01Q 3/34 |

\* cited by examiner

SCALABLE BEAM STEERING CONTROLLER SYSTEMS AND METHODS

BACKGROUND

As is known in the art, a phased array antenna includes a plurality of radiating elements each with a phase shifter. Beam steering systems can control a direction of a main lobe of a radiation pattern of the radiating elements in the phased array antenna. Beam steering may be accomplished by switching the antenna elements or by changing the relative phases of RF signals driving the elements. For example, beams can be formed by shifting the phase of the signal emitted from each radiating element, to provide constructive/destructive interference so as to steer the beams in a desired direction.

Some conventional scalable beam steering control systems utilize a master and slave type configuration in which a master unit connects to multiple slave units. However, in such systems, the master unit does not directly connect or control the radiating elements of the phased array antenna. Instead, the master unit connects to the slave units and the master unit relies on the slave units to control the radiating elements of the phased array antenna. Thus, the master is additional circuitry that is needed to control the phased array antenna but does not control radiating elements. Further, the slave units connect to the master unit and do not connect with or communicate with other slave units in the beam steering control system.

SUMMARY

The concepts, systems and method described herein provide a scalable beam steering control system having a primary beam steering controller and one or more secondary beam steering controllers. The primary beam steering controller and the one or more secondary beam steering controllers are each coupled to a subsection of a scalable planar array (i.e., array block) having a plurality of antenna elements. In an embodiment, the primary beam steering controller and the one or more secondary beam steering controllers may each control the plurality of antenna elements of the array block they are coupled to and provide power regulation for the respective array block. The one or more secondary controller blocks may connect to the primary controller block as well as to one or more additional secondary controller blocks in the beam steering control system. Thus, the secondary controller blocks may allow for more secondary controller blocks to connect together behind the primary controller block in the beam steering control system.

For example, a scalable planar array may include a plurality of array blocks, each block having a plurality of elements. In one embodiment, each array block may have 256 elements or a plurality of elements in increments of 256 elements. The scalable planar array may use digital controls having a standard interface and regulated power from a standard aircraft power form to provide beam steering control (BSC).

Example scalable beam steering control systems described here provide interconnecting BSC modules of at least two different types (e.g., primary BSC module, secondary BSC module) that fit behind each of the array blocks in the scalable planar array. Each of the BSC modules may regulate power, for example, from 28 volts, to the array block. In an embodiment, the power may be bussed directly (e.g., in parallel) to each of the BSC modules through a power supply bus connection.

In an embodiment, the primary BSC module may serve as a system interface into the scalable planar array via a system controller connection (e.g., Ethernet) and provide power and control signals to an array block in the scalable planar array. The primary BSC module can provide digital control and power interfaces to one or more secondary BSC modules in an adjacent column of the scalable planar array.

The secondary BSC module may receive control and/or power synchronization signals from the primary BSC module and provide the control signals and/or power synchronization signals to one or more secondary BSC modules in the same column of the scalable planar array. For example, the secondary BSC module may provide a direct digital control and power synchronization signal to another secondary BSC module for an array block in an adjacent column of the scalable planar array.

In some embodiments, the primary and secondary BSC modules may feature low cost FPGAs to perform local beam steering calculation for the respective array block they are coupled to.

In one aspect, a beam steering control system is provided. The beam steering system includes a first array block having one or more array elements and a primary controller block coupled to the first array block. The primary controller block may include a first beam steering module to generate beam steering signals for at least one of the one or more array elements of the first array block and provide the beam steering signals to at least one of the one or more of the array elements of the first array block. The beam steering system may include a second array block having one or more array elements and a secondary controller block coupled to the primary controller block and the second array block. The secondary controller block may include a second beam steering module to generate beam steering signals for at least one of the one or more array elements of the second array block and provide the beam steering signals to at least one of the one or more of the array elements of the second array block.

In an embodiment, the primary controller block may include a power module to control power regulation for the array block and a status module to monitor a status of the array block and the secondary controller block. The primary controller block may be coupled to a system controller to receive control signals for the array block, the secondary controller block or both. In an embodiment, the secondary controller block may not be directly coupled to the system controller.

In an embodiment, the secondary controller block may include a power module to control power regulation for the array block and a status module to monitor a status of a second secondary controller block. In some embodiments, a width value and a length value of the first array block can be equal to a width value and a length value of the primary controller block and a width value and a length value of the second array block can be equal to a width value and a length value of the secondary controller block.

In some embodiments, the primary controller block and the secondary controller block may include sensing pins to couple to an adjacent or downstream controller block in the beam steering control system. The primary controller block and the secondary controller block may be coupled in parallel to a power supply through a power supply bus connection.

In an embodiment, the first and second array block may be coupled to a plurality of array blocks to form an array of 2×N array blocks. In some embodiments, a series of relay connectors may be used to route signals between a system controller, the primary controller block and the secondary controller block.

The secondary controller block may be coupled to a plurality of secondary controller blocks. For example, a first secondary controller block may be disposed downstream from the primary controller block and a second secondary controller block may be disposed adjacent to the primary controller block in an array of 2×N array blocks. In an embodiment, each secondary controller block in the plurality of secondary controller blocks may be coupled to at least one array block in the array of 2×N array blocks.

In some embodiments, at least one secondary controller block of the plurality of secondary controller blocks may provide beam steering signals to another secondary controller block in the array of 2×N array blocks. The primary controller block may be coupled to each of the plurality of secondary controller blocks in the array of 2×N array blocks. In an embodiment, the first beam steering module may generate beam steering signals for at least one of the one or more array elements in each of the array blocks in the array of 2×N array blocks and provide the beam steering signals to one of the one or more of the secondary controller blocks in the plurality of secondary controller blocks.

In another aspect, a beam steering control system is provided. The beam steering control system includes a plurality of array blocks, each array block having one or more array elements and a primary controller block. The primary controller block may be coupled to at least one array block. The primary controller block may include a first beam steering module to generate beam steering signals for the one or more array elements of the at least one array block and provide the beam steering signals to the one or more of the array elements of the at least one array block. The beam steering system may include a plurality of secondary controller blocks. Each of the secondary controller blocks may be coupled to at least one primary controller block and at least one array block. In an embodiment, each secondary controller block of the plurality of secondary controller blocks may include a beam steering module to generate beam steering signals for the one or more array elements of the at least one array block and provide the beam steering signals to the one or more of the array elements of the at least one array block.

In some embodiments, the primary controller block includes a power module to control power regulation for the array block and a status module to monitor a status of the array block and the secondary controller block. The primary controller block may be coupled to a system controller to receive control signals for the plurality of array blocks, the plurality of secondary controller blocks or a combination of them.

In some embodiments, each secondary controller block of the plurality of secondary controller blocks may include a power module to control power regulation for the array block and a status module to monitor a status of a second secondary controller block. The primary controller block and each of the plurality of secondary controller blocks may be coupled in parallel to a power supply through a power supply bus connection.

In some embodiments, the beam steering system may include a second primary controller block coupled to a second plurality of secondary controller blocks.

BRIEF DESCRIPTION OF THE DRAWINGS

The foregoing concepts and features may be more fully understood from the following description of the drawings.

The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

FIG. 2 is a top view of an array block;

FIG. 2A is a bottom view of the array block of FIG. 2;

DETAILED DESCRIPTION

Figure 1:
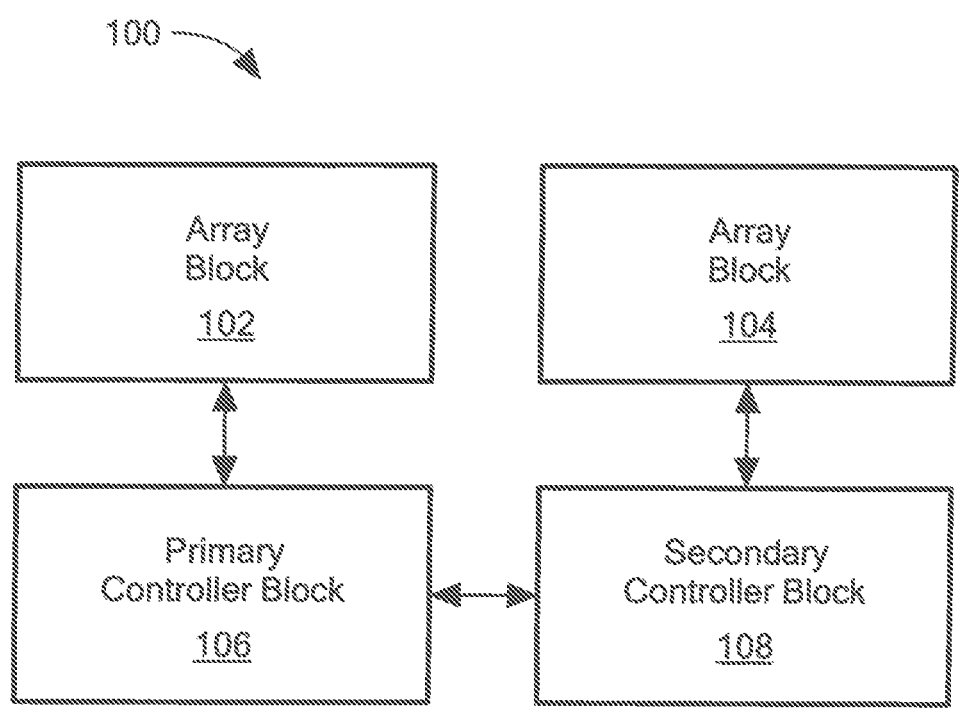
FIG. 1 is a block diagram of a scalable beam steering control system.

Now referring to FIG. 1, a scalable beam steering control system 100 includes first and second array blocks 102, 104, a primary controller block 106 and a secondary controller block 108. The primary controller block 106 is coupled to the first array block 102 and the secondary controller block 108. The secondary controller block 108 is coupled to the second array block 104 and the primary controller block 106. In an embodiment, scalable beam steering control system 100 may be part of an antenna array, such as an electronically steered phased array or an active electronically scanned array (AESA).

In an embodiment, an antenna array may include any number of array blocks 102, 104 (e.g., array elements or sub-arrays of array block) and may comprise a transmitting antenna, a receiving antenna, or a transmitting/receiving antenna. Each of the array blocks 102, 104 in the antenna array may have a plurality of active elements (e.g., radiating elements, antenna elements) or groups of active elements that can be controlled to control a property of a beam produced by the antenna array. In an embodiment, scalable beam steering control system 100 may be used to control a generation of and/or direction of a beam generated by the antenna array. For example, in some embodiments, each of primary controller block 106 and secondary controller block 108 may be coupled to at least one array block 102, 104. Primary controller block 106 may be used to control and steer a direction of a beam or beam portion generated by first array block 102. Secondary controller block 108 may be used to control and steer a direction of a beam or beam portion generated by second array block 102.

In an embodiment, scalable beam steering control system 100 may include any number of secondary controller blocks 108 and can be sized (e.g., expanded) to accommodate any number of array blocks in a particular antenna array, as will discussed in greater detail below.

Primary controller block 106 may be the main interface for the beam steering control system 100. For example, primary controller block 106 may receive commands and signals from a system controller (not shown) and distribute the commands and/or signals to one or more secondary controller blocks 108. In some embodiments, the primary controller block 106 may receive the commands and signals and use them to control first array block 102. Secondary controller block 108 may receive the commands and signals from the system controller through primary controller block 106 and use them to control second array block 104. Thus, in an embodiment, the secondary controller block 108 may not be directly coupled to the system controller. For example, the secondary controller block 108 may be coupled to the system controller through the primary controller block 106.

Secondary controller block 108 may communicate with other secondary controller blocks within a scalable beam steering control system as will be discussed in greater detail below. For example, Secondary controller block 108 may receive the commands and signals from primary controller block 106 and distribute them to adjacent or otherwise downstream secondary controller blocks within the r respective scalable beam steering control system.

Figure 2B:
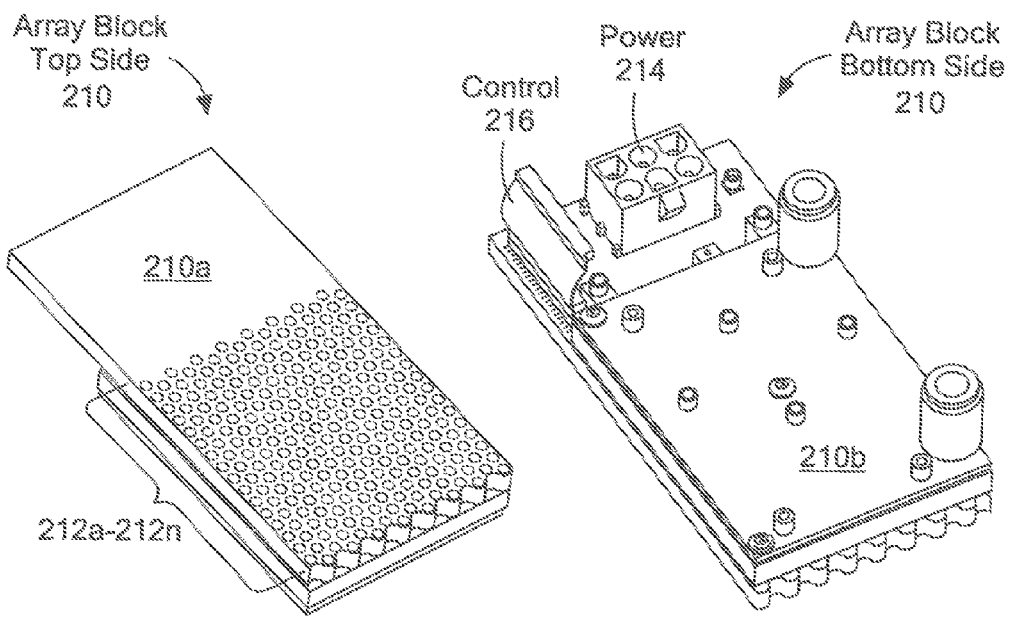
FIG. 2B is a top view of an antenna array having 2×N array blocks.
Figure 2B:
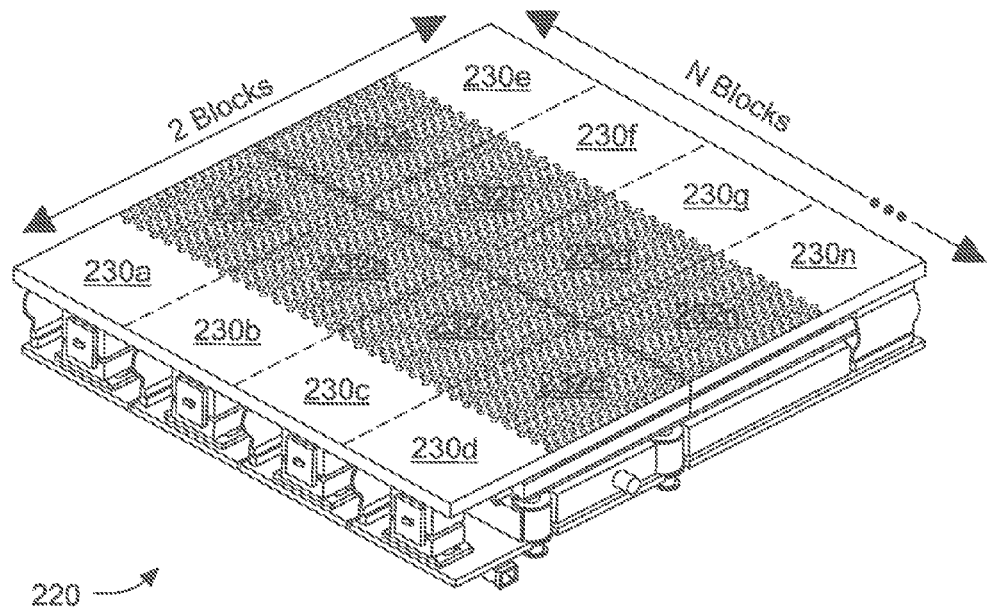

Now referring to FIG. 2, a top surface 210a of an array block 210 includes a plurality of array elements 212a-212n. The array elements 212a-212n may be disposed on or otherwise formed on a surface (here shown as the top surface 210a) of the array block 210. In some embodiments, the array block 210 may include 256 array elements. In other embodiments, the number of array elements 212a-212n may be selected in increments of 256. It should be appreciated however, that any number of array elements 212a-212n may be used in the array block 210 and the number may vary depending on an application of the array block 210 and/or the dimensions of the array block 210.

Now referring to FIG. 2A, a bottom surface 210b of the array block 210 includes a power connection 214 and a control connection 216. The power connection 214 and the control connection 216 may each be coupled to a primary controller block or a secondary controller block, such as primary controller block 106 or a secondary controller block 108 described above with respect to FIG. 1. Thus, the power connection 214 and control connection 216 may provide a means for a primary controller block or a secondary controller block to communicate with the array block 210 and/or control different properties of the array block 210.

In an embodiment, array block 210 may receive power signals through the power connection 214 from a primary controller block or a secondary controller block. The power signals may be used to control or regulate a power level of the array block 210.

Array block may receive beam steering control signals through the control connection 216 from a primary controller block or a secondary controller block. For example, the control signals may include beam steering control signals or status signals to monitor an electrical and/or environmental health status of the array block 210.

FIG. 2B, a top surface of an array antenna 220 having a plurality of array blocks 230a-230n. Each of the array blocks 230a-230n may be coupled together to form array antenna 220. In some embodiments, each array block 230a-230n may be a subsection of array antenna 220.

It should be appreciated that array antenna 220 may include any number of array blocks 230a-230n and the array blocks 230a-230n may be positioned in a variety of different arrangements. For example, in the illustrative embodiment of FIG. 2B, the array blocks 230a-230n are arranged to form antenna array 220 having 2×N array blocks 230a-230n, with the array blocks 230a-230n positioned in a 2×N arrangement. However, any number of array blocks 230a-230n may be used and other arrangements may be used. The design of the array antenna 220 may be selected based on the dimensions of the array antenna 200 and/or the dimensions of the individual array blocks 230a-230n, as well as a particular application of the array antenna 220.

In some embodiments, each of the array blocks 230a-230n may have the same dimensions (e.g., same length, width, thickness, etc.). In other embodiments, one or more of the array blocks 230a-230n in array antenna 220 may have different dimensions (e.g., different length, width, thickness, etc.). For example, one or more of the array blocks 230a-230n may have different dimensions in order to accommodate a particular application of the array antenna 220.

In an embodiment, each of the array blocks 230a-230n may have a plurality of array elements 232a-232n. Array elements 232a-232n may be disposed on a first surface of the array blocks 230a-230n. In some embodiments, array elements 232a-232n may be disposed over the entire first surface of each of the array blocks 230a-230n. In other embodiments, array elements 232a-232n may be disposed over a portion (e.g., half) of the first surface of each of the array blocks 230a-230n.

In some embodiments, each of the array blocks 230a-230n may have the same number of array elements 232a-232n. In other embodiments, one or more array blocks 230a-230n may have a different number of array elements 232a-232n. The array blocks 230a-230n may be arranged in the array antenna 220 such that each of their respective array elements 232a-232n may be positioned next to each other. For example, and as illustrated in FIG. 2B, each of the array blocks 230a-230n include array elements 232a-232n over a portion of their respective first surface. The array blocks 230a-230n can be arranged in the array antenna 220 such that each of their respective array elements 232a-232n are aligned with respect to array elements 232a-232n of an adjoining and/or adjacent array block 230a-230n.

Figure 3:
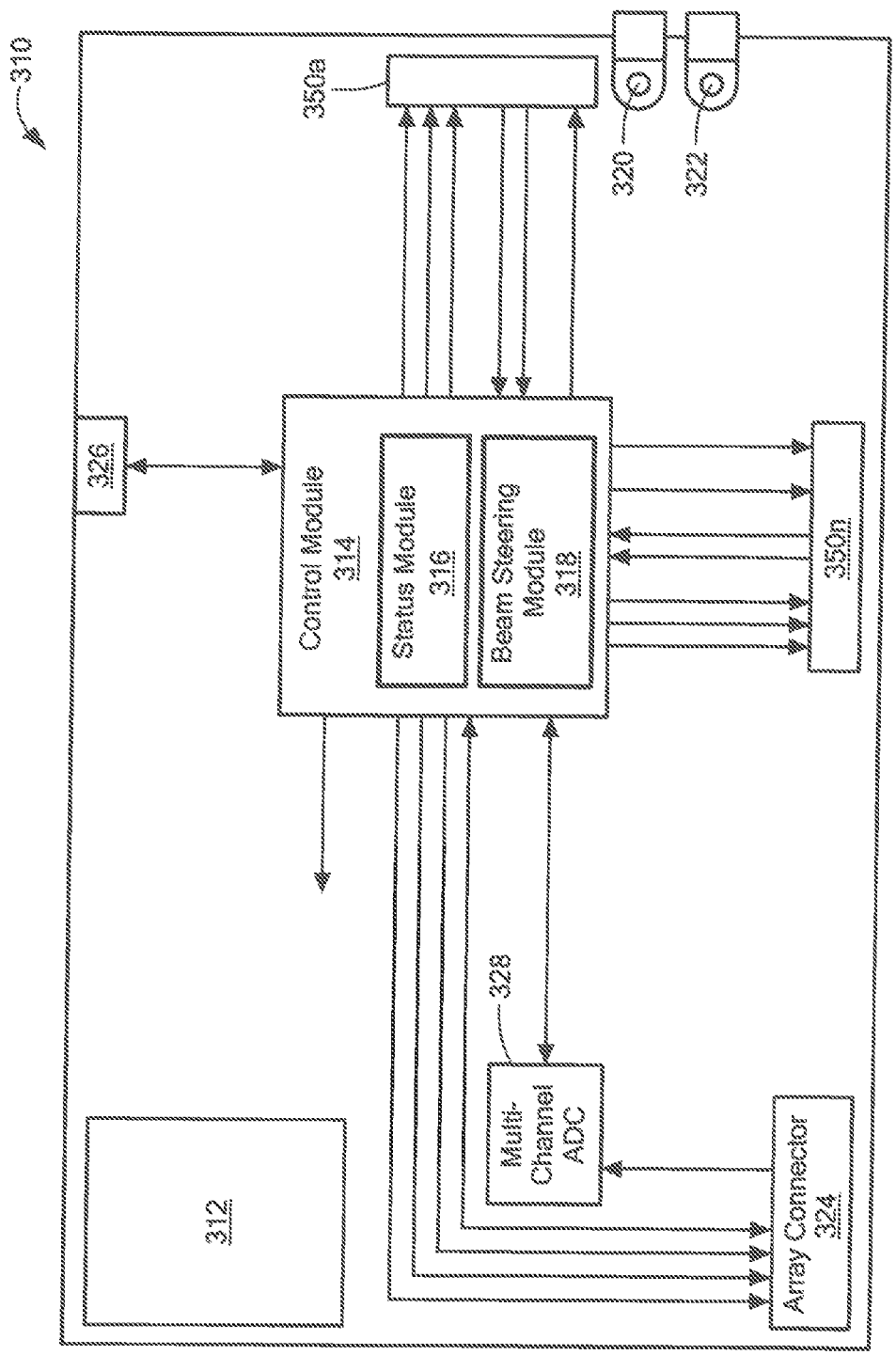
FIG. 3 is a block diagram of a primary controller block.

Now referring to FIG. 3, a primary controller block 310 includes an array power module 312, a control module 314, a relay connector 320, a power connector 322, an array connector 324, a system connector 326 and one or more pin connectors 350a-350n. In some embodiments, the primary controller block 310 may include an analog to digital converter (ADC) 328.

In an embodiment, primary controller block 310 may be the same or substantially similar to primary controller block 106 described above with respect to FIG. 1. Primary controller block 310 may be part of a beam steering control system for an antenna array and may be an interface for a system controller (not shown) to the antenna array. For example, primary controller block 310 may receive commands and signals from the system controller and use them or distribute them to one or more secondary controller blocks. To couple to the system controller, primary controller 310 may include the system connector 326.

System connector 326 may be coupled to control module 314 and the system controller to receive and transmit command and/or signals. In one embodiment, the system connector 326 may connect to the system controller through an Ethernet connection. For example, system connector 326 may be disposed in a signal path between the system controller and control module 314. The system controller may provide various commands and/or instructions (e.g., beam steering commands, status checks, power commands) to the control module 314 through the system connector 326.

Control module 314 may include a status module 316 and a beam steering module 318. In an embodiment, the control module 314 may comprise a processor, for example and without limitation, a system on a chip (SOC), an application-specific integrated circuit (ASIC), or a field-programmable gate array (FPGA). The status module 316 may generate status signals and transmit them to an array block. The status signals may be used to monitor and/or detect an electrical and/or environmental health status of the array block. For example, the status module 316 may receive a response signal from an array block indicating the electrical and/or environmental health status of the respective array block. In some embodiments, the status module 316 may generate an overall array status for an array block or a plurality of array blocks based on response signals. The status module 316 may generate the overall array status report and provide it to a system controller through the system connector 326. In some embodiments, status module 316 may transmit a status signal to one or more secondary controller blocks to request a status of an array coupled to the respective array block.

Beam steering module 318 may generate beam steering signals and transmit them to an array block or one or more secondary control blocks. Beam steering module 318 may calculate beam steering signals for an array block or a plurality of array blocks in an antenna array. For example, the beam steering signals may be used to control a property of one or more array elements in an array block. The properties may be changed to steer a beam produced by the array block or steer a beam produced by an antenna array having a plurality of array blocks including the array block. In some embodiments, the beam steering signals may be used to individually address and/or modify one or more array blocks to control a direction of a beam and/or electronically steer a beam. In an embodiment, the beam steering signal may include attenuation data, time delay data and/or phase data for a beam.

In some embodiments, beam steering module 318 may receive beam steering instructions from the system controller and use the beam steering instructions to calculate beam steering signals for an array block or a plurality of array blocks in an antenna array that are coupled to a secondary controller block. For example, the instructions may include information regarding changing a direction of a main lobe of a radiation pattern generated by the array block or the antenna array having the plurality of array blocks. Beam steering module 318 may transmit the appropriate beam steering instructions to the secondary controller blocks coupled to the respective array blocks to be controlled. In an embodiment, the instructions may include information regarding changing (e.g., increase, decrease) an activity level of one or more array elements in an array block or a plurality of array blocks. In some embodiment, the instructions may include information regarding changing a relative phases of a signal driving one or more array elements in an array block or a plurality of array blocks. In some embodiments, the beam steering module 318 may transmit beam steering signals to a second primary control block.

The primary controller block 310 may include the relay connector 320 to receive and/or transmit commands and/or signals to one or more secondary blocks in an array antenna and/or a second primary controller block in the array antenna. The commands and/or signals may include, but not limited to, status signals, power signals and beam steering signals. The relay connector 320 may be the same as or substantially similar to the series of relay connections 504a-504n described below with respect to FIG. 5 and relay connections 604 described below with respect to FIG. 6.

The primary controller block 310 may include a power connector 322 to receive and transmit power signals to one or more secondary blocks in an array antenna and/or a second primary controller block in the array antenna. For example, in one embodiment, power signals may be transmitted through the power connector to regulate a power level an array block coupled to a particular secondary controller block. The power connector 322 may be the same as or substantially similar to the series of relay connections 504a-504n described below with respect to FIG. 5 and relay connections 604 described below with respect to FIG. 6.

Primary controller block 310 may include an array connector 324 to couple to at least one array block. For example, the primary controller block 310 may transmit control signals, beam steering signals, status signals and/or power signals to the respective array block. Array connector 324 may be coupled to control module 314 to receive and transmit signals and/or data.

In an embodiment, array power module 312 may couple to at least one array block. For example, the array power module 312 may control and/or regulate a power level (e.g., activity level) of one or more elements of an array block coupled to the primary controller block 310. In one embodiment, the array power module 312 may provide power conditioning of the one or more elements of an array block coupled to the primary controller block 310. Array power module 312 may be coupled to control module 314 to receive and transmit power signals and/or data.

In some embodiments, primary controller block 310 may include a multi-channel analog to digital converter (ADC) 328 to convert a voltage value to a digital number. For example, in some embodiments, the ADC converter 328 may receive a signal (e.g., a continuous-time and continuous-amplitude analog signal) and convert the signal to a sequence of digital values represented of the received signal. ADC converter 328 may be coupled to control module 314 to receive and transmit signals and/or data. In some embodiments, ADC converter 328 can be coupled to array connector 324 and control module 314. For example, ADC converter 328 may be disposed in a signal path between array connector 324 and control module 314.

In an embodiment, pin connectors 350a-350n may couple to an adjacent or downstream secondary controller block within a beam steering control system. The pin connections 350a-350n may detect the presence of or the absence of a connection to and/or from an adjacent and/or downstream secondary controller block. Control module 314 may use this information to control routing of commands and signals to and from primary controller block 310 to one or more secondary controller blocks (or a second primary controller block). Pin connectors 350a-350n may be the same as or substantially similar to sensing pins 650a-650n described below with respect to FIG. 6.

Figure 4:
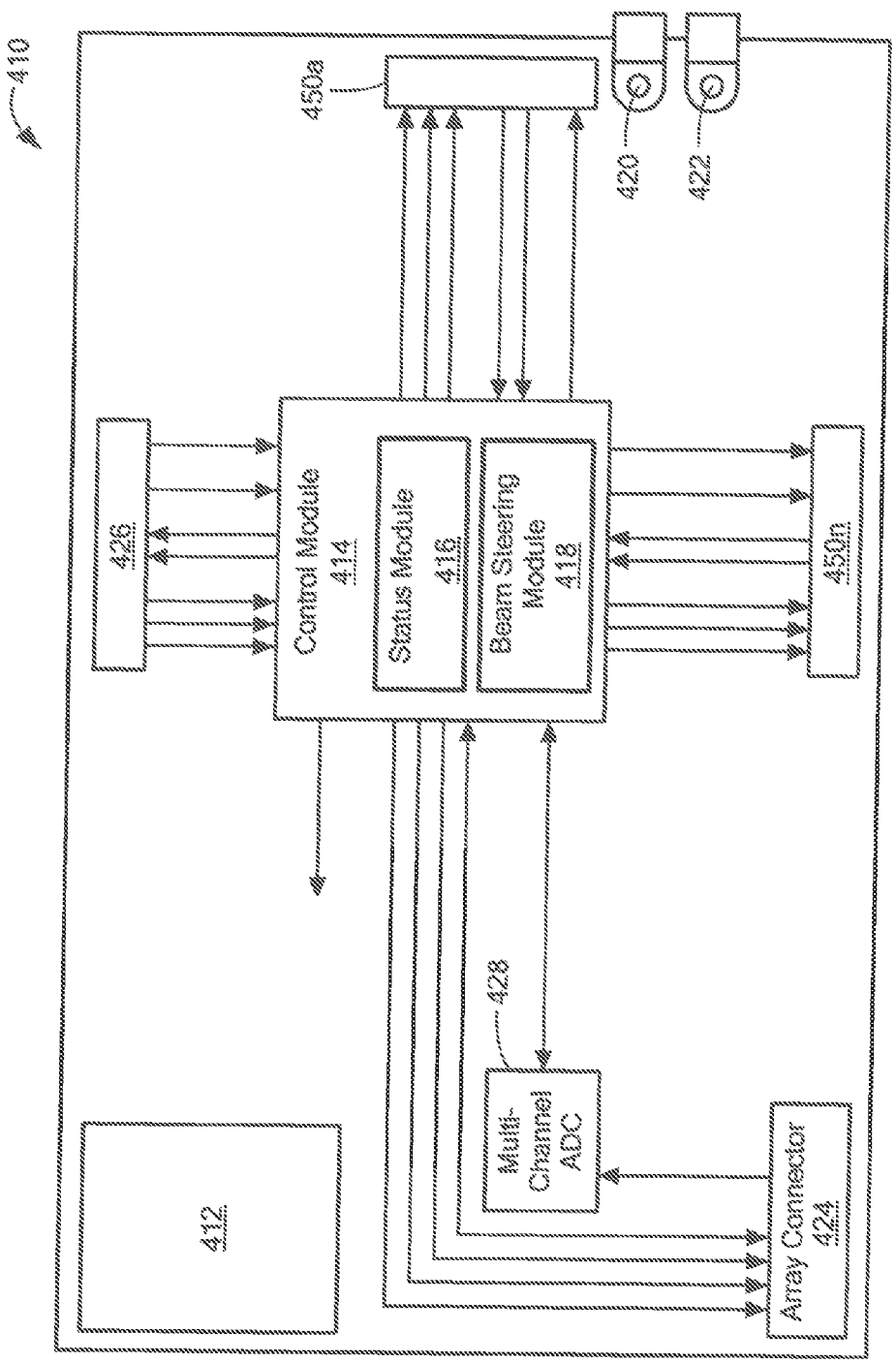
FIG. 4 is a block diagram of a secondary controller block.

Now referring to FIG. 4, a secondary controller block 410 includes an array power module 412, a control module 414, a relay connector 420, a power connector 422, an array connector 424, a block connector 426 and one or more pin connectors 450a-450n. In some embodiments, the primary controller block 410 may include an analog to digital converter (ADC) 428.

In an embodiment, secondary controller block 410 may be coupled to at least one array block and receive commands and/or signals from a primary controller block to control the array block. Secondary controller block 410 may be coupled to the primary controller block through the block connector 426.

Block connector 426 may provide a connection to the primary and/or another secondary controller block for the secondary controller block 410 to receive and transmit signals and/or data. Block connector 426 may be disposed in a signal path between control module 414 and a primary and/or another secondary controller block to transmit and/or receive various commands and/or instructions (e.g., beam steering commands, status checks, power commands). For example, the secondary controller block 410 may not be directly coupled to a system controller and thus may receive one or more control signals generated by the system controller from the primary controller block through block connector 426. In some embodiments, block connector 426 may be coupled to control module 414 and a bus carrying data and signals to a primary and/or another secondary controller block.

In an embodiment, control module 414 may include a status module 416 and a beam steering module 418. In an embodiment, control module 414 may be a processor, for example and without limitation, a system on a chip (SOC), an application-specific integrated circuit (ASIC), or a field-programmable gate array (FPGA). The status module 416 may generate status signals and transmit them to an array block. The status signals may be used to monitor and/or detect an electrical and/or environmental health status of the array block. For example, the status module 416 may receive a response signal from an array block indicating the electrical and/or environmental health status of the respective array block. In some embodiments, the status module 416 may generate an overall array status for an array block or a plurality of array blocks based on response signals. The status module 416 may generate the overall array status report and provide it to a primary and/or another secondary block through the block connector 426.

In some embodiments, beam steering module 418 may receive beam steering instructions from a primary controller block and use the beam steering instructions to calculate beam steering signals for an array block coupled to secondary controller block 410. For example, the instructions may include information regarding changing a direction of a main lobe of a radiation pattern generated by the array block. The beam steering signals may be used to control a property of one or more array elements in the array block. The properties may be changed to steer a beam produced by the array block or steer a beam produced by an antenna array having a plurality of array blocks including the array block. In some embodiments, the beam steering signals may be used to individually address and/or modify one or more array elements in an array block to control a direction of a beam and/or electronically steer a beam. In an embodiment, the beam steering signal may include attenuation data, time delay data and/or phase data for a beam.

In some embodiments, beam steering module 418 may transmit the beam steering instructions received from the primary controller block to one or more secondary controller blocks. In an embodiment, the instructions may include information regarding changing (e.g., increase, decrease) an activity level of one or more array elements in an array block or a plurality of array blocks. In some embodiment, the instructions may include information regarding changing a relative phases of a signal driving one or more array elements in an array block or a plurality of array blocks.

The secondary controller block 410 may include the relay connector 420 to receive and/or transmit commands and/or signals to one or more secondary blocks in an array antenna and/or a second primary controller block in the array antenna. The commands and/or signals may include, but not limited to, status signals, power signals and beam steering signals. The relay connector 420 may be the same as or substantially similar to the series of relay connections 504a-504n described below with respect to FIG. 5 and relay connections 604 described below with respect to FIG. 6.

The secondary controller block 410 may include a power connector 422 to receive and transmit power signals to one or more secondary blocks in an array antenna and/or a second primary controller block in the array antenna. For example, in one embodiment, power signals may be transmitted through the power connector to regulate a power level an array block coupled to a particular secondary controller block. The power connector 422 may be the same as or substantially similar to the series of relay connections 504a-504n described below with respect to FIG. 5 and relay connections 604 described below with respect to FIG. 6.

Secondary controller block 410 may include an array connector 424 to couple to at least one array block. For example, the secondary controller block 410 may transmit control signals, beam steering signals and/or status signals to the respective array block. Array connector 424 may be coupled to control module 414 to receive and transmit signals and/or data.

In an embodiment, array power module 412 may couple to at least one array block. For example, the array power module 412 may control and/or regulate a power level (e.g., activity level) of one or more elements of an array block coupled to secondary controller block 410. In one embodiment, the array power module 412 may provide power conditioning of the one or more elements of an array block coupled to the primary controller block 410. Array power module 412 may be coupled to control module 414 to receive and transmit power signals and/or data.

In some embodiments, secondary controller block 410 may include a multi-channel analog to digital converter (ADC) 428 to convert a voltage value to a digital number. For example, in some embodiments, the ADC converter 428 may receive a signal (e.g., a continuous-time and continuous-amplitude analog signal) and convert the signal to a sequence of digital values represented of the received signal. ADC converter 428 may be coupled to control module 414 to receive and transmit signals and/or data. In some embodiments, ADC converter 428 can be coupled to array connector 424 and control module 414. For example, ADC converter 428 may be disposed in a signal path between array connector 424 and control module 414.

In some embodiments, secondary controller block 410 may include pin connectors 450a-450n may couple to an adjacent or downstream secondary controller block within a beam steering control system. The pin connections 450a-450n may detect the presence of or the absence of a connection to and/or from an adjacent and/or downstream secondary controller block. Control module 414 may use this information to control routing of commands and signals to and from primary controller block 410 to one or more secondary controller blocks (or a second primary controller block). Pin connectors 450a-450n may be the same as or substantially similar to sensing pins 650a-650n described below with respect to FIG. 6.

Figure 5:
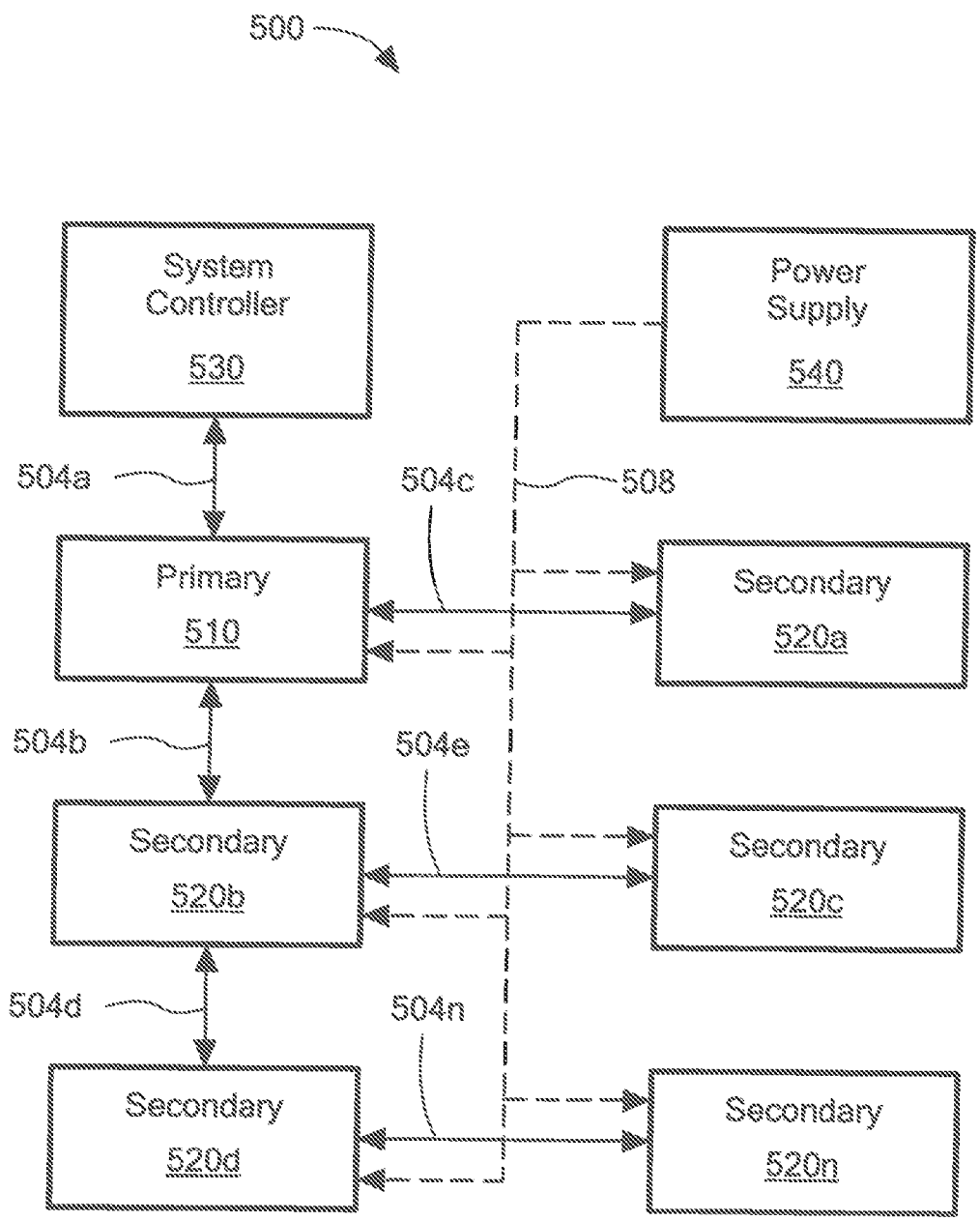
FIG. 5 is a circuit diagram of an array antenna having a primary controller block and a plurality of secondary controller blocks.

Now referring to FIG. 5, a beam steering control system 500 is provided having a primary controller block 510 and a plurality of secondary controller blocks 520a-520n. In an embodiment, beam steering control system 500 may be an expandable system as any number of secondary controller blocks may be used in the beam steering control system 500. For example, in some embodiments, the number of secondary controller blocks may be selected at least based on the number of array blocks or elements in an antenna array.

Figure 5A:
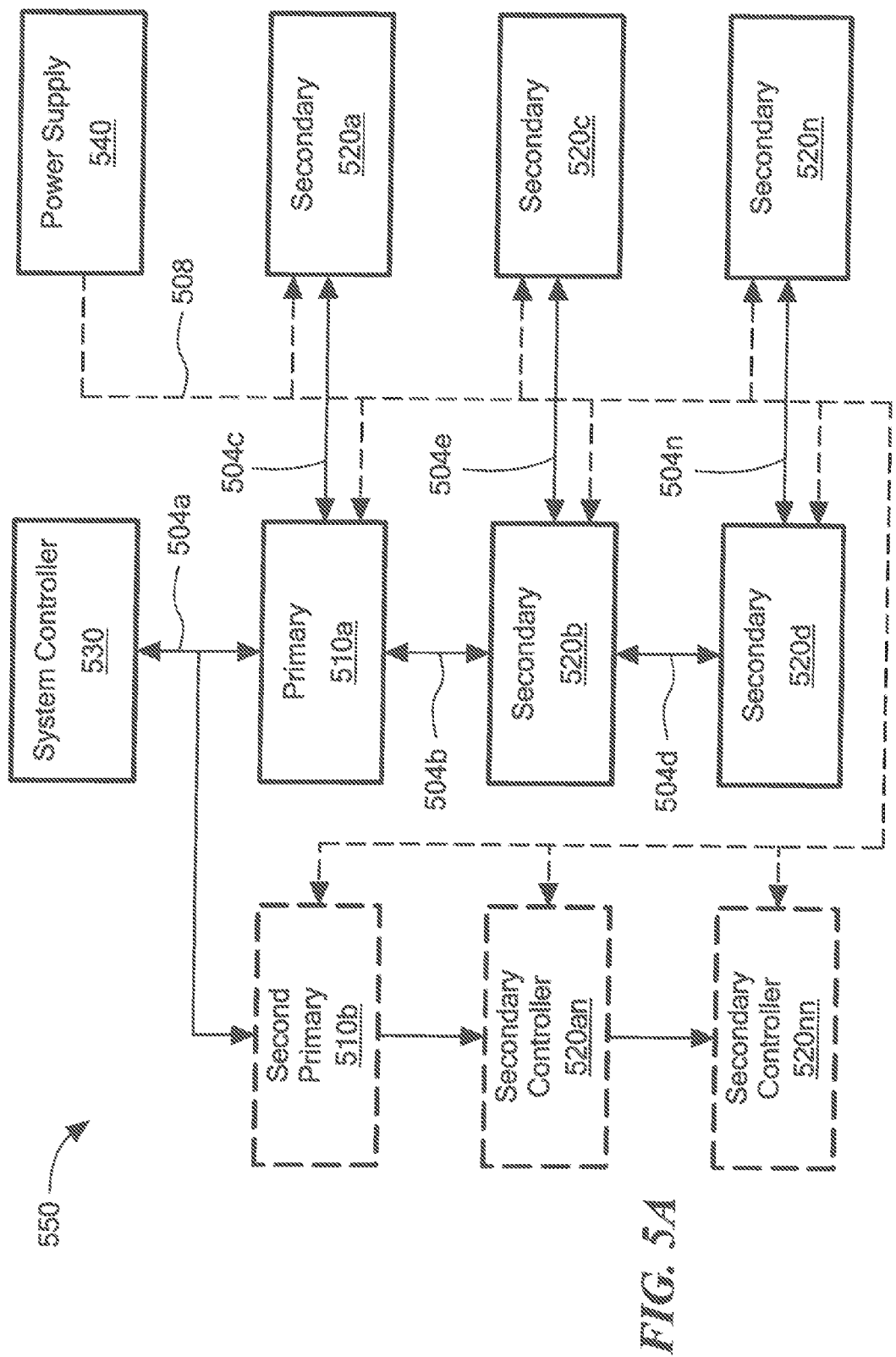
FIG. 5A is a circuit diagram of an array antenna having two primary controller blocks and a plurality of secondary controller blocks.

In an embodiment, although FIG. 5 illustrates a beam steering control system 500 having one primary controller block 510, it should be appreciated that in some embodiments, a multiple primary controller blocks may be used. For example, and referring briefly to FIG. 5A, a beam steering control system 550 may have a first primary controller block 510a and a second primary controller block 510b. First primary controller block 510a may be coupled to a first plurality of secondary controller blocks 520a-520n. Second primary controller block 510b may be coupled to a second plurality of secondary controller blocks 520an-520nn. The controller blocks (e.g., both primary and secondary controller blocks) may be organized into subsections of an overall antenna array and each primary controller block may operate as a primary block for its respective subsection within the antenna array.

For example, first primary controller block 510a may be an interface for the system controller 530 for a first subsection and second primary controller block 510b may be an interface for the system controller for a second subsection. In an embodiment, beam steering control system 550 may be the same or substantially similar to beam steering control system 500, however, beam steering control system 550 includes two primary controller blocks 510a, 510b and a first and second plurality of secondary controller blocks 520a-520n, 520an-520nn.

Referring back to FIG. 5, in an embodiment, the primary controller block 510 and plurality of secondary controller blocks 520a-520n may be interconnected though a communication system of relay connectors 504a-504n to relay commands and signals to different controller blocks within the beam steering control system 500 that may be and may not be directly coupled to primary controller block 510. For example, in some embodiments, the primary controller block 510 and plurality of secondary controller blocks 520a-520n may be organized in a hierarchical communications system, such that commands and signals can be communicated upstream and downstream from primary controller block 510 through a last secondary controller block 520n using one or more secondary controller blocks 520a-520n. Upstream and downstream may generally refer to a position in the hierarchal communication system relative to primary controller block 510.

In an embodiment, beam steering control system 500 may have secondary controller blocks 520a-520n positioned adjacent to primary controller block 510 and downstream from primary controller block 510. Thus, the primary connector 510 may be directly coupled to multiple secondary controller blocks 520a-520n (e.g., both adjacent and downstream blocks).

The plurality of secondary controller blocks 520a-520n may be coupled to one or more secondary controller blocks 520a-520n. For example, a second secondary controller block 520b may have a third secondary controller block 520c positioned adjacent to it and a fourth secondary controller block 520d positioned downstream.

In the illustrative embodiment of FIG. 5, beam steering control system 500 is provided as a 2×N array of primary and secondary controller blocks, however it should be appreciated that other sizes and organizations of controller blocks may be used in a beam steering controller system. The number of connections for a controller block in a respective beam steering controller system may depend on the size and/or configuration of the beam steering system. For example, in one embodiment, in a 3×N array, one or more secondary controller blocks may be positioned in a second column of the array and may be coupled to up to four different secondary controller blocks.

In an embodiment, primary controller block 510 may be coupled (e.g., directly coupled, communicatively coupled) to a system controller 530 through relay connector 504a and may be coupled to each of the plurality of secondary controller blocks 520a-520n through the series of relay connectors 504b-504n. For example, and as shown in the illustrative embodiment of FIG. 5, adjacent and/or downstream secondary controller blocks 520a-520n may receive commands and signals from system controller 530 and/or primary controller block 510 through primary controller block 510 and/or one or more different secondary controller blocks 520a-520n. In one embodiment, a third secondary controller block 520c may receive commands and signals from primary controller block 510 through first secondary controller block 520a and/or second secondary controller block 520b.

Primary controller block 510 may interface with the system controller 530 and relay commands and signals to secondary controller blocks 520a-520n. In some embodiments, primary controller block 510 may collect status updates from one or more of the plurality of secondary controller blocks 520a-520n and provide them to system controller 530.

Secondary controller blocks 520a-520n may receive and transmit commands and signals to other secondary controller blocks 520a-520n within beam steering control system 500. For example, a secondary controller block may receive commands and signals from primary controller block 510 and one or more secondary controller blocks 520a-520n that are upstream from the respective secondary controller block. A secondary controller block may relay commands and signals to one or more secondary controller blocks 520a-520n that are positioned adjacent and/or downstream in the beam steering control system. In some embodiments, a secondary controller block may collect status updates from one or more secondary controller blocks 520a-520n that are positioned adjacent and/or downstream in the beam steering control system and provide the status updates to primary controller block 510 and one or more secondary controller blocks 520a-520n that are upstream from the respective secondary controller block.

Primary controller block 510 and the plurality of secondary controller blocks 520a-520n may be coupled to a power supply 540 through a power connector 508. In an embodiment, the power connector may be a bus connection to coupled primary controller block 510 and the plurality of secondary controller blocks 520a-520n may in parallel to the power supply 540. The power supply 540 may provide based on a specific application and need of the beam steering control system 500 and/or each of the primary and secondary controller blocks. For example, in one embodiment, the power supply may provide 28 volts that is distributed to the primary controller block 510 and each of the plurality of secondary controller blocks 520a-520n.

In some embodiments, the beam steering control system 500 may use one or more regulators (e.g., step down regulators, linear regulators) to step down the voltage from the power source to an appropriate level for a respective array block. The regulators may be part of the power connector 508 line. For example, the regulators may be disposed between the power supply and the primary controller block 510 and the plurality of secondary controller blocks 520a-520n. The regulators may be organized at different levels to step down the voltages to different levels for different sources. For example, a first level regulator may step down the voltage to an intermediate level (e.g., 6 v, 4 v, etc. 230) and then one or more second level regulators may step down to a different level (e.g., 5 v, 3.3 v, 1 v, etc.) to be provided to different components of a primary controller block, secondary controller block and or array elements in an array block.

Figure 6:
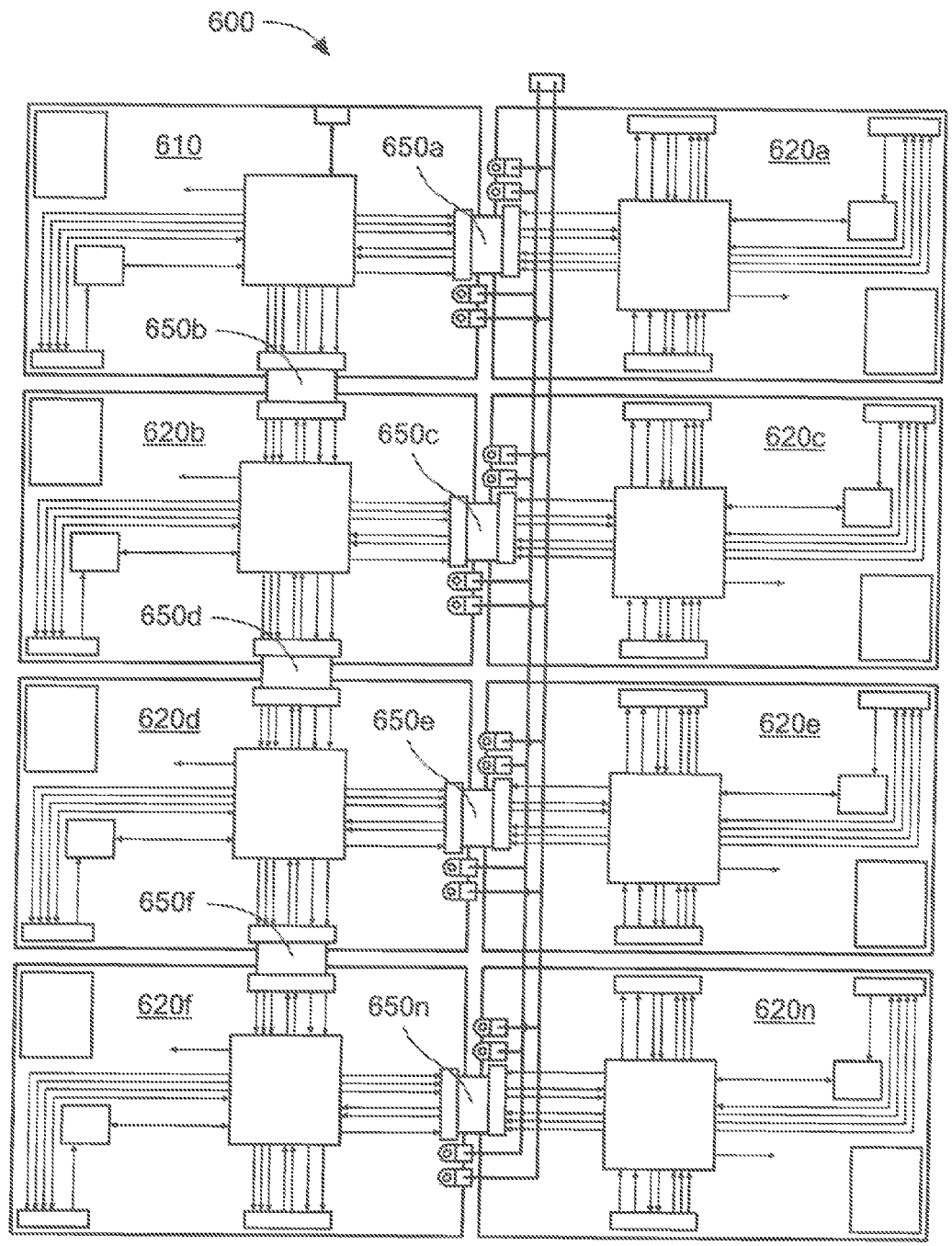
FIG. 6 is a schematic illustrating the interconnections between the primary controller block and the plurality of secondary controller blocks of FIG. 5.

Now referring to FIG. 6, a beam steering control system 600 is provided having a primary controller block 610 and a plurality of secondary controller blocks 620a-620n. In an embodiment, beam steering control system 600 may be the same or substantially similar to beam steering control system 500, however beam steering control system 600 illustrates the components of primary controller block 610 and each of the secondary controller blocks 620a-620n.

In the illustrative embodiment of FIG. 6, one embodiment of the series of relay connectors 604a-604n coupling system controller 630 to the primary controller block 610 and system controller 630 to each of the secondary controller blocks 620a-620n through primary controller block 610 is provided. In an embodiment, power supply 640 is coupled to primary controller block 610 and each of the secondary controller blocks 620a-620n through parallel power connecter 608.

In an embodiment, each of the primary controller block 610 and the plurality of secondary controller blocks 620a-620n may include sensing pins 650a-650n to couple to an upstream downstream and/or adjacent controller block within the beam steering control system 600. The sensing pins 650a-650n may be used to detect the presence of and/or the absence of a connection to and/or from upstream, downstream and/or adjacent controller blocks to control routing of commands and signals to and from a respective controller block. For example, in one embodiment, the sensing pins 650a-650n may be used to detect absence of a connection to and/or from an upstream controller block in the same column as the respective controller block to control routing of commands and signals to and from the respective controller block to another controller block in the same column.

Figure 7:
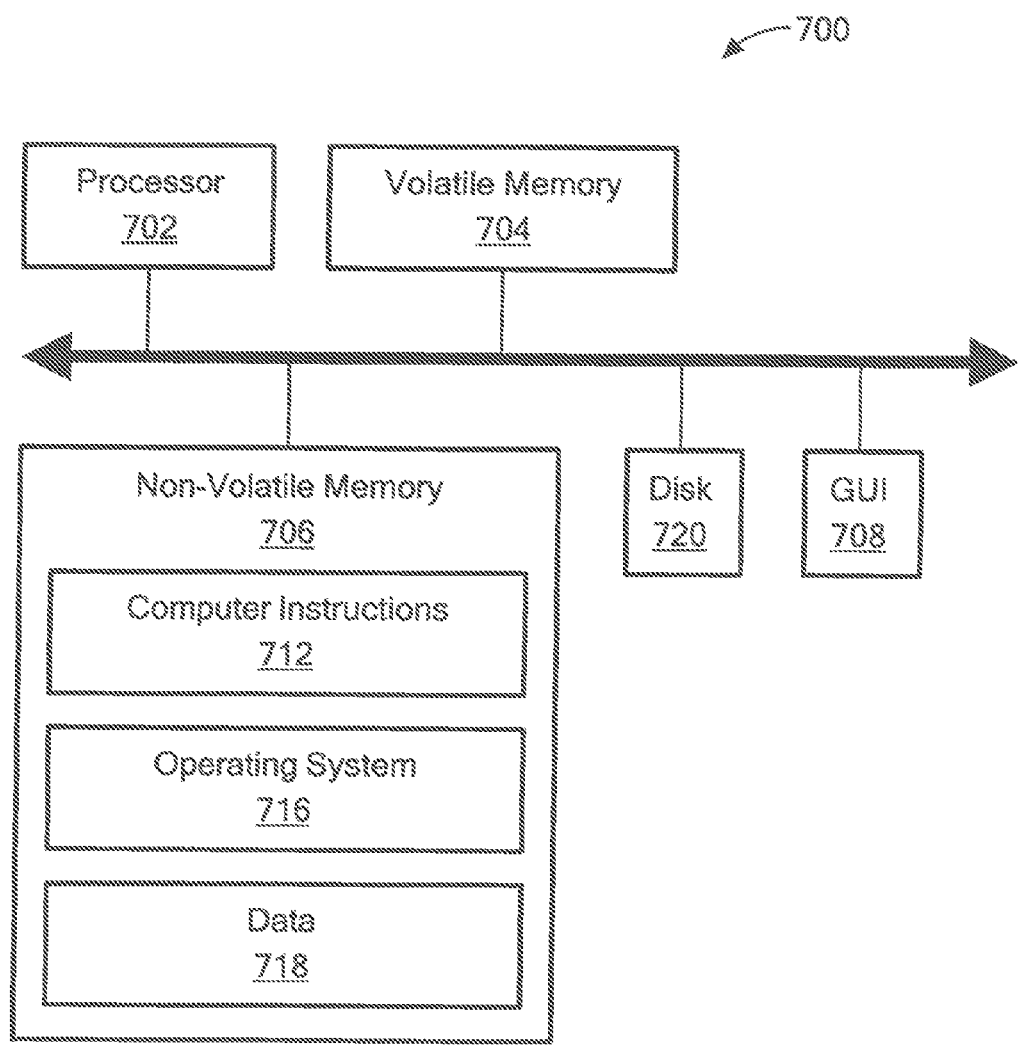
FIG. 7 is a block diagram of an embodiment of a computer system.

Referring to now FIG. 7, a computer 700 includes a processor 702, a volatile memory 704, a non-volatile memory 706 (e.g., hard disk), a graphical user interface (GUI) 708 (e.g., a mouse, a keyboard, a display, for example) and a computer disk 720. The non-volatile memory 706 stores computer instructions 712, an operating system 716 and data 718. In an embodiment, the data 718 may include commands and/or signals for controlling one or more array elements of an array block or an antenna array (e.g., status signals, power signals, beam steering signals, etc.). The data may include information regarding changing a direction of a main lobe of a radiation pattern generated by an array block, information for controlling a property of one or more array elements in the array block. In an embodiment, the data may include attenuation data, time delay data and/or phase data for a beam generated by the array block.

In some embodiments, non-volatile memory 706 includes a look-up table that stores and organizes data corresponding to the beam steering properties of one or more array blocks. In one example, the computer instructions 712 are executed by the processor 702 out of volatile memory 704 to perform all or part of the methods (or processes) described herein.

In an embodiment, computer 700 may be the same as or substantially similar to each of the primary controller block 106, 310, 510, 610 and secondary controller blocks 108, 410, 520a-520n, 620a-620n and their individual components. Computer 700 may perform all of the same functions and be configured to receive and generate the same data as each of the primary controller block 106, 310, 510, 610 and secondary controller blocks 108, 410, 520a-520n, 620a-620n and their individual components.

Methods described herein are not limited to use with the hardware and software of FIG. 7; they may find applicability in any computing or processing environment and with any type of machine or set of machines that is capable of running a computer program. Methods described herein may be implemented in hardware, software, or a combination of the two. Methods described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the methods described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the methods described herein. Methods described herein may also be implemented as a machine-readable storage medium, configured with a computer program, where upon execution, instructions in the computer program cause the computer to operate in accordance with the methods described herein.

Methods described herein may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed:
1. A beam steering control system comprising:
a first array block having one or more array elements;
a primary controller block coupled to the first array block, wherein the primary controller block comprises a first beam steering module to generate beam steering signals for at least one of the one or more array elements of the first array block and provide the beam steering signals to at least one of the one or more of the array elements of the first array block, and wherein the primary controller block comprises a primary power module to provide power conditioning and regulate a power level of the one or more array elements of the first array block; and a second array block having one or more array elements; and a secondary controller block coupled to the primary controller block and the second array block, wherein the secondary controller block comprises a second beam steering module to generate beam steering signals for at least one of the one or more array elements of the second array block and provide the beam steering signals to at least one of the one or more of the array elements of the second array block and wherein the secondary controller block comprises a secondary power module to provide power conditioning and regulate a power level of the one or more array elements of the second array block;

wherein the primary controller block and the secondary controller block are coupled in parallel to a power supply through a power supply bus connection.

2. The system of claim 1, wherein the primary controller block and the secondary controller block comprise sensing pins to couple to an adjacent or downstream controller block in the beam steering control system.

3. The system of claim 1, wherein the first and second array block are coupled to a plurality of array blocks to form an array of 2×N array blocks.

4. The system of claim 3, further comprising a series of relay connectors to route signals between a system controller, the primary controller block and the secondary controller block.

5. The system of claim 4, wherein the secondary controller block is coupled to a plurality of secondary controller blocks and wherein a first secondary controller block is disposed downstream from the primary controller block and a second secondary controller block is disposed adjacent to the primary controller block in the array of 2×N array blocks.

6. The system of claim 5, wherein each secondary controller block in the plurality of secondary controller blocks is coupled to at least one array block in the array of 2×N array blocks.

7. The system of claim 5, wherein the secondary controller block of the plurality of secondary controller blocks is coupled to one or more of the plurality of secondary controller blocks to provides beam steering signals to another secondary controller block in the array of 2×N array blocks.

8. The system of claim 5, wherein the primary controller block is coupled to each of the plurality of secondary controller blocks in the array of 2×N array blocks.

9. The system of claim 8, wherein the primary controller block is coupled to each of the plurality of secondary controller blocks in the array of 2×N array blocks through one or more of the plurality of secondary controller blocks.

10. The system of claim 8, wherein the first beam steering module generates beam steering signals for at least one of the one or more array elements in each of the array blocks in the array of 2×N array blocks and provides the beam steering signals to one of the one or more of the secondary controller blocks in the plurality of secondary controller blocks.

11. The system of claim 1, wherein a width value and a length value of the first array block is equal to a width value and a length value of the primary controller block and a width value and a length value of the second array block is equal to a width value and a length value of the secondary controller block.

12. The system of claim 1, wherein the primary controller block is coupled to a system controller to receive control signals for the array block, the secondary controller block or both.

13. The system of claim 12, wherein the secondary controller block receives the control signals from the primary controller block, and wherein the secondary controller block is not directly coupled to the system controller.

14. A beam steering control system comprising:
a plurality of array blocks, each array block having one or more array elements;
a primary controller block, wherein the primary controller block is coupled to at least one array block, wherein the primary controller block comprises a first beam steering module to generate beam steering signals for the one or more array elements of the at least one array block and provide the beam steering signals to the one or more of the array elements of the at least one array block, and wherein the primary controller block comprises a primary power module to provide power conditioning and regulate a power level of the one or more array elements of the at least one array block; and
a plurality of secondary controller blocks, wherein each secondary controller blocks is coupled to the primary controller block and at least one array block, wherein each secondary controller block of the plurality of secondary controller blocks comprise a beam steering module to generate beam steering signals for the one or more array elements of the at least one array block and provide the beam steering signals to the one or more of the array elements of the at least one array block and wherein each secondary controller block comprises a secondary power module to provide power conditioning and regulate a power level of the one or more array elements of the at least one array block;
wherein the primary controller block and each of the plurality of secondary controller blocks are coupled in parallel to a power supply through a power supply bus connection.

15. The system of claim 14, wherein the primary controller block is coupled to a system controller to receive control signals for the plurality of array blocks, the plurality of secondary controller blocks or a combination of them.

16. The system of claim 14, a first secondary controller block is coupled to a second secondary controller block to provide beam steering signals from the first secondary controller block to the second secondary controller block.

17. The system of claim 14, wherein the primary controller block is coupled to each of the plurality of secondary controller blocks in the array of 2×N array blocks through one or more of the plurality of secondary controller blocks.

18. The system of claim 14, wherein a width value and a length value of each of the plurality of array blocks is equal to a width value and a length value of the primary controller block and a width value and a length value of each of the plurality of secondary controller blocks.

19. The system of claim 14, further comprising a second primary controller block and a second plurality of secondary controller blocks.

* * * * *